W. A. AUSTIN.
MEANS FOR OPERATING THE CLUTCHES OF RACK LOCOMOTIVES.
APPLICATION FILED DEC. 3, 1912.

1,124,990.

Patented Jan. 12, 1915.

2 SHEETS—SHEET 1.

W. A. AUSTIN.
MEANS FOR OPERATING THE CLUTCHES OF RACK LOCOMOTIVES.
APPLICATION FILED DEC. 3, 1912.

1,124,990.

Patented Jan. 12, 1915.
2 SHEETS—SHEET 2.

Witnesses—

Inventor—
William A. Austin
by his Attorneys—
Howson & Howson

UNITED STATES PATENT OFFICE.

WILLIAM A. AUSTIN, OF LIMA, OHIO, ASSIGNOR TO THE BALDWIN LOCOMOTIVE WORKS, OF PHILADELPHIA, PENNSYLVANIA, A CORPORATION OF PENNSYLVANIA.

MEANS FOR OPERATING THE CLUTCHES OF RACK-LOCOMOTIVES.

1,124,990.  Specification of Letters Patent.  Patented Jan. 12, 1915.

Application filed December 3, 1912. Serial No. 734,704.

*To all whom it may concern:*

Be it known that I, WILLIAM A. AUSTIN, a citizen of the United States, residing in Lima, county of Allen, State of Ohio, have invented certain Improvements in Means for Operating the Clutches of Rack-Locomotives, of which the following is a specification.

My invention relates to certain improvements in means for operating the clutch mechanism of combined adhesion and rack locomotives, whereby the toothed rack wheels can be thrown into and out of engagement with the driving mechanism, as fully described hereinafter.

The object of the invention is to provide a mechanism which can be actuated by air under pressure or steam from the cab of a locomotive.

Figure 1:
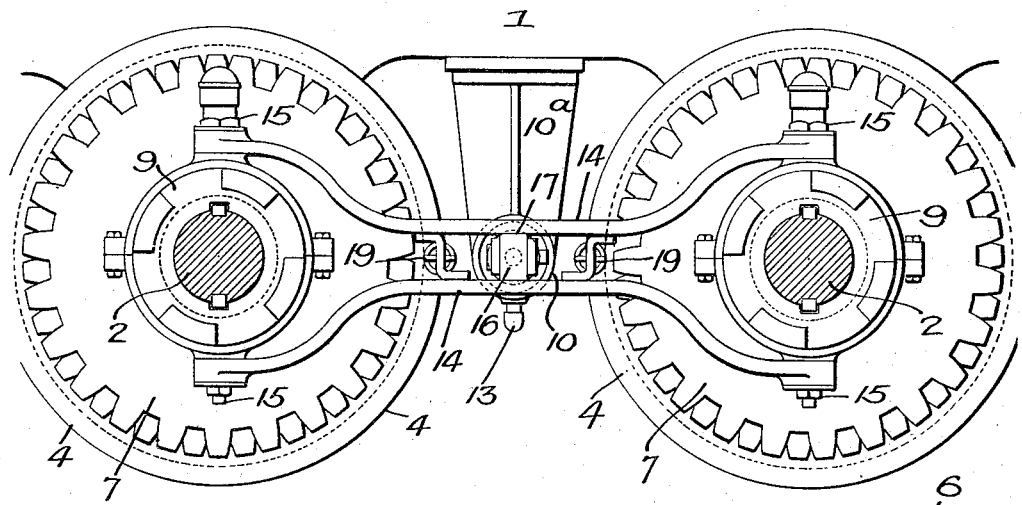
Figure 2:
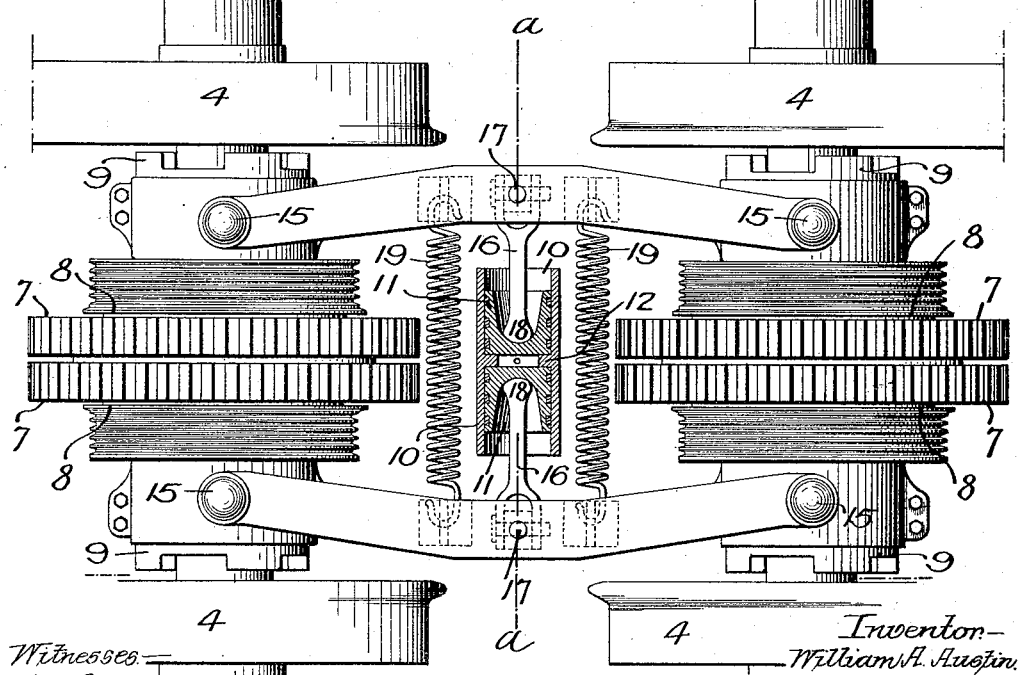
Figure 3:
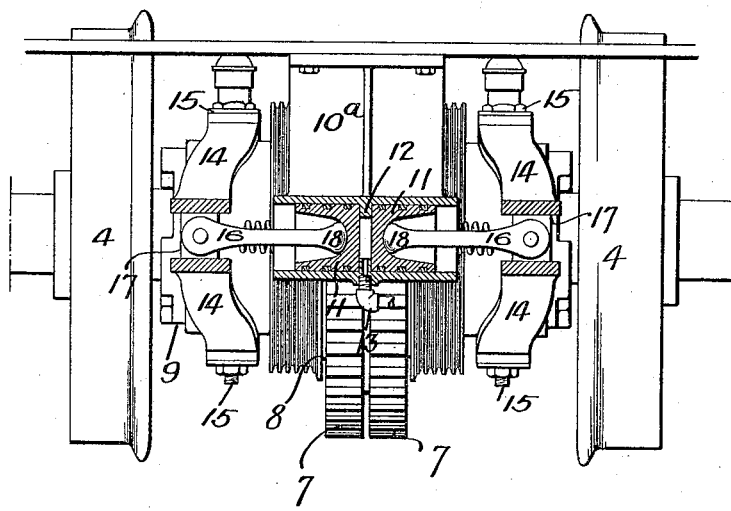
Figure 4:
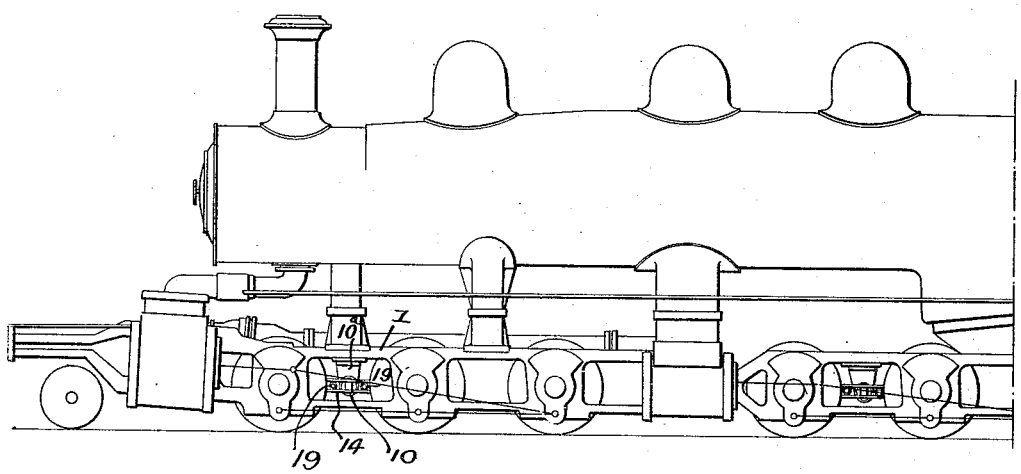

In the accompanying drawings:—Figure 1, is a longitudinal sectional view through two axles of the frame of a locomotive illustrating my invention; Fig. 2, is a plan view, showing the air cylinders in section; Fig. 3, is a transverse sectional view on the line *a—a*, Fig. 2; and Fig. 4, is a side view of a portion of a locomotive illustrating my invention.

This invention is particularly adapted for use in operating the clutches of a combined adhesion and rack locomotive, as shown in the patent to S. M. Vauclain and J. Y. McConnell, #586,405, July 13, 1897, and the patent to S. M. Vauclain, #1,114,555, October 20, 1914. It will be understood that it may be used with other types of locomotives without departing from the spirit of the invention.

Referring to the drawings, 1 is a portion of the frame of the locomotive of the type specified.

2, 2 are the axles.

4, 4 are the traction wheels, loose on the axles.

5, 5 are the cranks having pins 6 for the reception of the connecting rods by which the axles are driven. Secured to the center of each axle is a toothed rack wheel 7 and on each side of each rack wheel is a brake drum 8, also secured to the axle. Mounted on each axle on each side of the toothed wheel, beyond the brake drums, are clutch sleeves 9 splined to the axle so that while they turn positively therewith, they are free to slide longitudinally thereon. The clutch sleeves have the usual clutch teeth which engage corresponding teeth on the hubs of the wheels 4 when the clutch sleeves are projected.

In order to actuate the four clutch sleeves in unison, I provide a cylinder 10 hung by brackets 10$^a$ from the frame 1 of the locomotive, in the present instance, and mounted in this cylinder are pistons 11, which are prevented from coming close together by an internal flange 12 on the cylinder and into this space is admitted air under pressure or steam through a pipe 13. This pipe leads, preferably, to the cab of the locomotive where a valve is provided by which air under pressure, or steam, is controlled.

Extending from one clutch sleeve to the other at each side of the center are bars 14, forked at their outer ends to span clutch sleeves and connected to said sleeves by pins 15, which are adapted to rings mounted in grooves in the clutch sleeves 9. Rods 16 are pivoted at 17 to each bar 14 and have rounded heads 18, which rest against the rounded surface in the recess of each piston 11. This construction of connection is flexible and allows the engine to rise and fall on its carrying springs. The two bars 14 are connected together at each side of the cylinder 10 by springs 19 so that as soon as the air is exhausted from the cylinder the springs retract the clutch sleeves and throw them out of engagement with the clutch faces on the wheels of the tubular or hollow shafts on which the wheels are mounted.

By the above construction a very simple and effective arrangement is provided for actuating the clutch sleeves and this mechanism can be operated from any point desired on the cab of a locomotive.

While I have described my invention as particularly adapted for use in connection with locomotives, it will be understood that the mechanism can be used on any truck or frame on which there are two axles having rack wheels and traction wheels.

I claim:

1. The combination of a frame; two axles mounted thereon; traction wheels loose on said axles; rack wheels secured thereto and adapted to mesh with the rack of the track; each traction wheel having a clutch face; clutch sleeves mounted on the axles and arranged to engage the faces of the traction wheels; bars extending from one axle to the other on each side of the rack wheels and engaging the clutch sleeves; a fixed cylinder located on the frame between the axles; plungers in the cylinder connected to the bars; said cylinder having an air or steam inlet whereby air or steam is admitted to the space between the plungers to cause the plungers to be forced apart and to shift the clutch sleeves into engagement with the clutch faces on the traction wheels.

2. The combination of a frame; two axles mounted therein; toothed wheels centrally mounted on each axle; tubular shafts mounted on each end of each axle and adapted to bearings in the frame; means for driving said tubular shafts; traction wheels secured to the tubular shafts and each having a clutch face; clutch sleeves slidably mounted on the axles on each side of the central toothed wheel; bars extending from one axle to the other and engaging the clutch sleeves; a cylinder fixed to the frame and located between the two bars; plungers in the cylinder; rods pivotally connected to the bars and having heads adapted to rest against sockets in the plungers; and springs tending to draw the two bars together.

3. The combination of a frame; two axles mounted therein; toothed wheels centrally mounted on each axle; hollow shafts mounted on the ends of each axle; a crank on the outer end of each hollow shaft; traction wheels, also mounted on the ends of each hollow shaft, and having a clutch face; a clutch sleeve on each axle on each side of the toothed wheel and splined to the axle so as to turn with but slide thereon in order to engage the clutch face of the traction wheels; a fixed cylinder located centrally with respect to the axle and secured to the frame; said cylinder having an internal flange; a plunger in the cylinder on each side of the flange; said cylinder having an air or steam inlet at the flange; bars extending from one axle to the other on each side of the cylinder and connected with the clutch sleeves; rods adapted to each bar and bearing against the plungers; a spring on each side of the cylinder connecting the bars so as to retract the clutch sleeves when the plungers are released from pressure.

In testimony whereof, I have signed my name to this specification, in the presence of two subscribing witnesses.

WILLIAM A. AUSTIN.

Witnesses:
 LEWIS E. HEIGHTNER,
 MARY A. MCKERREN.